(12) United States Patent
Ajay Kumar et al.

(10) Patent No.: US 12,325,353 B2
(45) Date of Patent: Jun. 10, 2025

(54) LIGHT INTENSITY CONTROL SYSTEM FOR A VEHICLE

(71) Applicant: TVS MOTOR COMPANY LIMITED, Chennai (IN)

(72) Inventors: Vasu Ajay Kumar, Chennai (IN); Balaganesh Selvarajan, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 113 days.

(21) Appl. No.: 17/799,757

(22) PCT Filed: Mar. 10, 2021

(86) PCT No.: PCT/IN2021/050230
§ 371 (c)(1),
(2) Date: Aug. 15, 2022

(87) PCT Pub. No.: WO2021/181413
PCT Pub. Date: Sep. 16, 2021

(65) Prior Publication Data
US 2023/0077175 A1    Mar. 9, 2023

(30) Foreign Application Priority Data
Mar. 12, 2020 (IN) .............. 202041010511

(51) Int. Cl.
*B60Q 1/14* (2006.01)
*B60Q 1/26* (2006.01)
*B60Q 3/00* (2017.01)
*B60Q 5/00* (2006.01)
*B60Q 11/00* (2006.01)

(52) U.S. Cl.
CPC ......... *B60Q 1/1423* (2013.01); *B60Q 1/2676* (2013.01)

(58) Field of Classification Search
CPC ... B60Q 1/00; B60Q 3/00; B60Q 5/00; B60Q 11/00; B60Q 2200/00; B60Q 2300/00; B60Q 2800/00; B60Q 2500/00; B60Q 2400/00; B60Q 2900/00; B60Q 9/00
See application file for complete search history.

(56) References Cited

U.S. PATENT DOCUMENTS 6,008,946 A    12/1999   Knowles
2008/0278821 A1*   11/2008   Rieger ................. H04N 13/344
                                                    359/630

(Continued)

FOREIGN PATENT DOCUMENTS

| DE | 102012103293 A1 | 10/2013 |
|----|----|----|
| DE | 102015205107 A1 | 9/2016 |
| JP | 2009-92810 A | 4/2009 |

OTHER PUBLICATIONS

Head-Mounted Display Device Translation, Author: Miyake Nobuyuki, pp. 1-5 (Year: 2009).*

(Continued)

*Primary Examiner* — Wei (Victor) Y Chan
(74) *Attorney, Agent, or Firm* — Osha Bergman Watanabe & Burton LLP

(57) ABSTRACT

A light intensity control system in a vehicle enables the head lamp of the vehicle and the display of the instrument cluster to switch between one or more beam position depending on the ambient light intensity directly in the field view of the driver's eye.

4 Claims, 5 Drawing Sheets

(56) References Cited

U.S. PATENT DOCUMENTS

| | | | |
|---|---|---|---|
| 2013/0148375 A1* | 6/2013 | Connor | B60Q 1/32 |
| | | | 362/554 |
| 2016/0152179 A1* | 6/2016 | Gauld | G06V 40/19 |
| | | | 315/155 |
| 2016/0174335 A1* | 6/2016 | Park | H05B 47/105 |
| | | | 315/77 |
| 2016/0231573 A1* | 8/2016 | Mullins | G02B 27/017 |
| 2017/0242253 A1* | 8/2017 | Benesh | G02B 27/0172 |
| 2019/0353910 A1* | 11/2019 | Gwalani | G02B 27/0172 |

OTHER PUBLICATIONS

Head-Mounted Display Device Author: Miyake Nobuyuki; pp. 1-9 (Year: 2009).*
International Search Report issued in corresponding International Application No. PCT/IN2021/050230 mailed Jul. 6, 2021 (4 pages).
Written Opinion issued in corresponding International Application No. PCT/IN2021/050230 mailed Jul. 6, 2021 (9 pages).

* cited by examiner

LIGHT INTENSITY CONTROL SYSTEM FOR A VEHICLE

TECHNICAL FIELD

The present subject matter relates generally to a vehicle. The present subject matter specifically but not exclusively related to a light intensity control system for said vehicle.

BACKGROUND

Automatic headlamp switching between high and low beam during night travel helps in safe driving and reduces rider effort. In certain cases automatic turning-on and turning-off system for automobile lamplight provides a system and method for switching ON/OFF headlamp depending on distance sensor and ambient brightness acquisition system. This method turns headlamp ON/OFF during threshold conditions and is aimed at helping the driver for better view of external conditions while driving. Some even have wired communication between sensor circuit and headlamp driver circuit and hence it is prone to damage due to wire getting cut or short circuit.

There are also LED based systems where automatic dimming system are provided for avoiding visual problems caused by the headlamp operated at the same time by two approaching cars. It uses distance sensor and ambient light sensor to achieve the result.

BRIEF DESCRIPTION OF THE DRAWINGS

The detailed description is described with reference to the accompanying figures. The same numbers are used throughout the drawings to reference like features and components.

DETAILED DESCRIPTION

Ambient light plays a crucial role in comfort as well as safety of the rider. Especially during night time, when ambient light becomes low in intensity, driving in multi-lane roads with vehicles moving in both direction affects the visibility for the rider resulting in safety risk & potential accidents.

During driving at night, when two vehicles are approaching each other with headlamp in high beam position, visibility of the road becomes poor for both riders. Hence riders switches the headlamp to low beam position for a brief period of time. This improves visibility to the approaching rider. Usually, switching headlamp to low beam position to improve road visibility for the approaching rider is done with the help of handle bar switches and handle bar switches requires manual intervention and it may not give better response during the time when within split seconds the ambient light changes which may result in cloudy judgement of the rider leading to an accident.

An ambient light sensor is placed in the vehicle body and is claimed to be in the vehicle field. But in two wheelers, the vehicle field is not always coinciding with driver's visual field and additionally location of ambient light acquisition system in vehicle makes it prone to damage due to presence of a wire getting cut or short circuit or damage due to vehicle condition.

Similarly, the instrument cluster display illumination needs to vary as per the ambient light for better view and hence the location of the ambient light acquisition unit is very crucial to control the ambient light based digital system. Generally, the location of the ambient light sensor is provided on the vehicle for the instrument cluster like near the display of the instrument cluster Location of the ambient light sensor on the vehicle whether near the display of the instrument cluster or somewhere inside the vehicle makes the ambient light sensor prone to damage and presence of wired communication from the ambient light sensor to the brightness control system makes the system prone to noise. Also, the received ambient light intensity by the ambient light sensor mounted on vehicle may not be same as what the human eye perceives.

Hence, the object of the present subject matter is to provide a light intensity control system which is wireless and overcome all problems cited above as well as other problems of known art.

Figure 1:
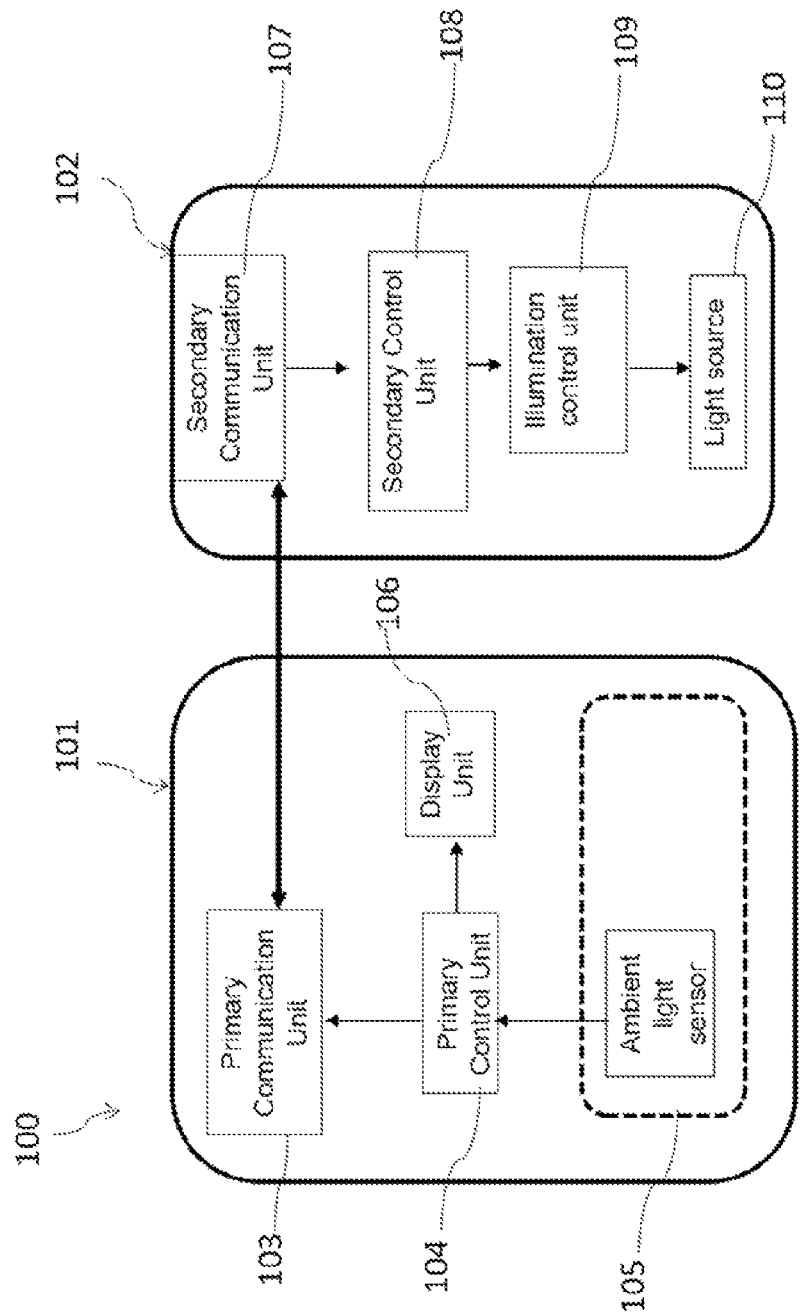
FIG. 1 illustrates architecture of the light intensity control system comprising a head mounting unit and a head lamp.

FIG. 1 depicts the architecture of the light intensity control system (100) comprising a head mounting unit (101) mounted on wearable head gear such as a helmet or goggles and a head lamp (102). The head mounting unit (101) further comprises a primary communication unit (103) which is electrically connected to a primary control unit (104). The primary control unit (104) is connected to an ambient light sensor (105) in the field view of the user that is the driver. The ambient light sensor (105) can detect the light quality and intensity outside of the helmet when the driver is driving a vehicle. The ambient light sensor (105) receives the ambient light intensity and the received input is used to modify or calibrate an illuminating device to match with the human eye's response to light under variety of lighting conditions as the person driving the vehicle receives the same intensity of light which is received by the ambient light sensor (105).

Ambient light means the light that is already present in a scene, before any additional lighting is added. The ambient light sensor (105) is a device that detects the amount of light in the vicinity. The ambient light sensor (105) is located on the head mounting unit (101) or on the outer surface of the helmet. Ambient light sensor (105) is used to sense the ambient light and provide the primary control unit (104) the necessary information to make decisions dependent on it and depending on the decisions made the head lamp (102) changes the intensity to match with the human's eye response.

The primary control unit (104) is also electrically connected to a primary display unit (106) which displays the features like parameters of the vehicle such as engine temperature, speed, distance travelled or any menu selected from the handheld device like incoming call. The primary communication unit (103) is a wireless unit such as Bluetooth, Wireless fidelity (Wi-Fi), Zigbee and ANT.

The head lamp (102) comprises of a secondary communication unit (107) which is also a wireless unit. The secondary communication unit (107) is electrically connected to a secondary control unit (108) which controls a light source (110) through an illumination control unit (109).

The ambient light in the field of view of the rider of the vehicle is acquired by the ambient light sensor (105) and then it is transferred to the secondary communication unit (107) of the head lamp (102). The primary communication unit (103) functions as transceiver and the secondary communication unit (107) functions as a receiver which gathers the information related to ambient light. The ambient light information is then transferred to the secondary control unit (108) of the head lamp (102) and then the secondary control unit (108) controls the light source (110) like LED light array through a illumination control unit (109).

Figure 2:
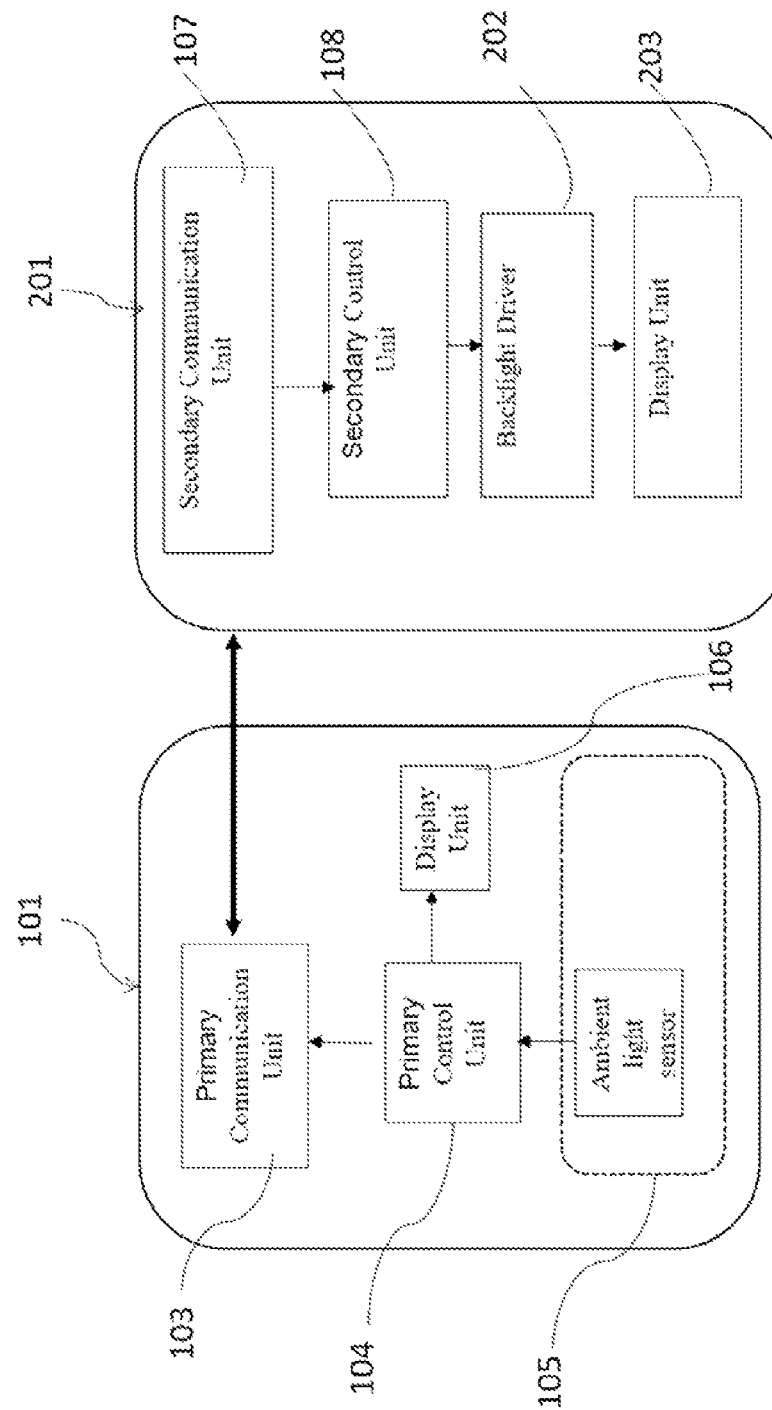
FIG. 2 illustrates an embodiment of the light intensity control system where the head lamp has been replaced with an instrument cluster.

FIG. 2 illustrates another embodiment where the head lamp (102) has been replaced with an instrument cluster (201) with an illuminating display. The instrument cluster also comprises of a secondary communication unit (107) which receives the ambient light information form the primary communication unit (103).

The secondary control unit (108) provided in the instrument cluster (201) compares the received ambient light data with a threshold value. The threshold value depends on the current brightness value of the illuminating display of the instrument cluster (201). The gradient at which the brightness of the illuminating display of the instrument cluster (201) changes is such that it is not detectable to a backlight driver (202). A backlight driver (202) is controlled according to the brightness value which the secondary control unit (108) decides after comparing the received the ambient light data with that of the current brightness value and after comparing the ambient light data with the current brightness value of the instrument cluster (201), the backlight driver (202) controls the illumination of a display unit (203).

Figure 3:
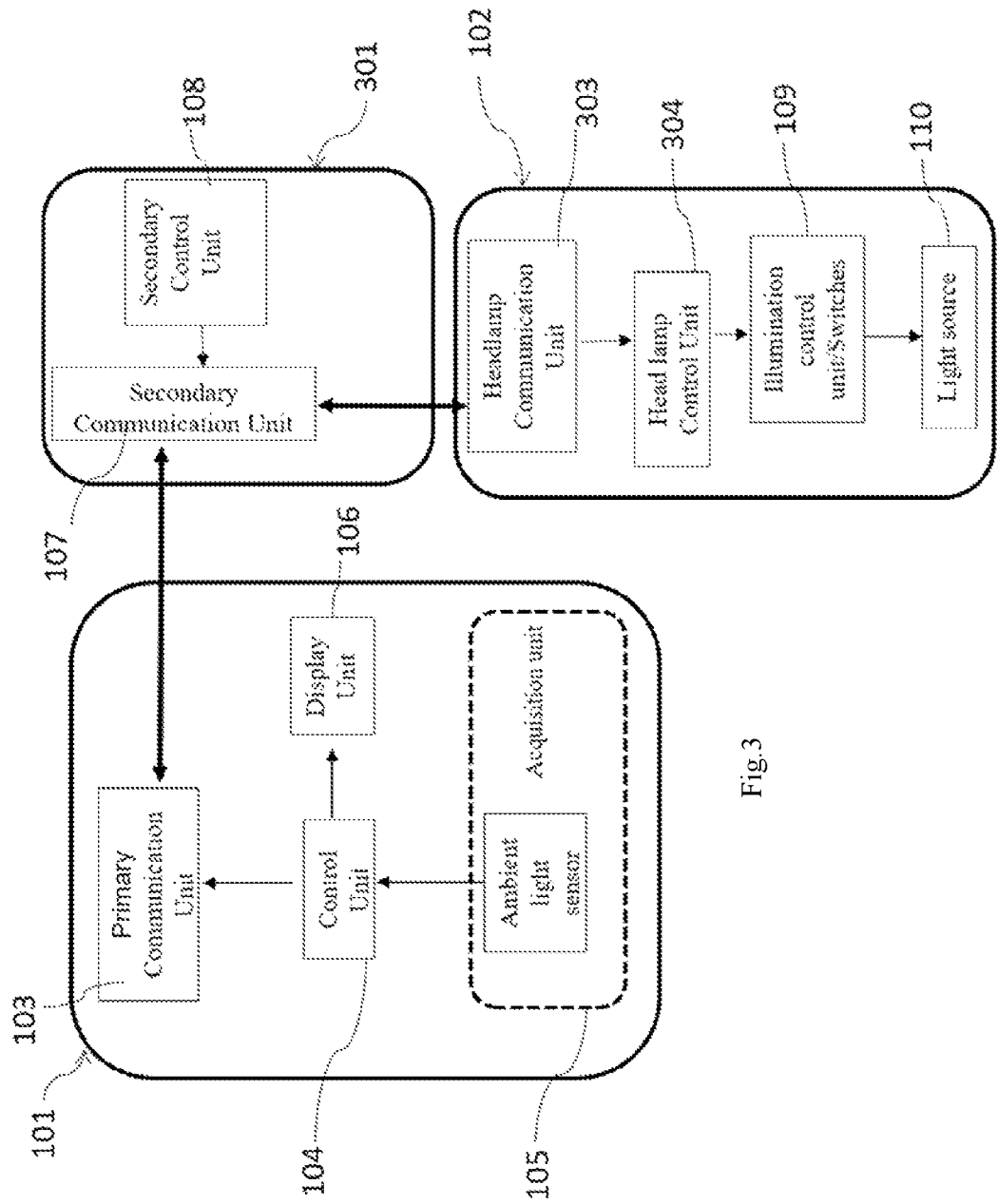
FIG. 3 illustrates an embodiment utilizing an engine control unit (ECU) of the vehicle which allows automatically switching of the light source between high and low beam position in order to assist the driver as well as the approaching vehicle. The vehicle ECU communicates with the head lamp through wireless communication.

FIG. 3 illustrates a block diagram of present subject matter to automatically switch the light source (110) between high and low beam position in order to assist the driver as well as the approaching vehicle to get better view of the road.

The ambient light sensor (105) receives the ambient light that is incident in the field of view of the driver. Since the location of the ambient light sensor (105) is in the field of view of the rider, the primary control unit (104) in the head mounted unit (101) identifies the high beam from an approaching vehicle which may cause disturbance to the driver.

When high beam is detected from the approaching vehicle, the primary control unit (104) sends a message to a vehicle engine control unit (ECU) (301). The message is transmitted wirelessly to the vehicle ECU (301) from the primary communication unit (103). The vehicle ECU (301) relays the message to the headlamp unit (102). This relay message is transmitted wirelessly. After receiving the message, the head lamp control unit (304) in the headlamp unit (102) checks the current illumination condition of the light source (110), whether it is in high beam or low beam condition.

If the current illumination condition of the light source (110) is in high beam condition then the light source (110) switches to low beam when current ambient light intensity is low and then switches back to high beam condition if the current ambient light intensity gets high. The switch action is similar to toggle function which switches the light source (110) of the headlamp unit (102) to low beam position or high beam position depending on the ambient light intensity. The light source (110) can be LED-array based or LASER-based.

The illumination control unit (109) of the head lamp (102) can be a switching regulator or a linear regulator or a solenoid actuator to perform the switching action depending on the type of light source such as the (Light emitting diode) LED arrangement used in the headlamp unit (102).

In a case where individual Light emitting diodes (LEDs) are controlled by a switching regulator, the illumination control unit (109) changes the duty cycle of the Pulse width modulation (PWM) input accordingly in order to switch from high beam to low beam. In case the illumination control unit (109) is through linear regulator, the illumination control unit (109) sets the resistance accordingly to control the LED array to switch between high and low beam. In case a separate array of LEDs controlled by a switch, a solenoid actuator basically controls the switch to perform the switching action from high beam to low beam and vice versa.

All the functionalities described above automatically function once wireless communication is established and automatic switching can be deactivated with the help of a switch provided on the handle bar or head mounted unit (101) or the instrument cluster (201). This functionality can also be deactivated through a mobile application. As per an embodiment, when operating in automatic mode, in case the user presses the switch to change from high to low beam then the user input is taken on high priority to override the action of the control unit.

Figure 4:
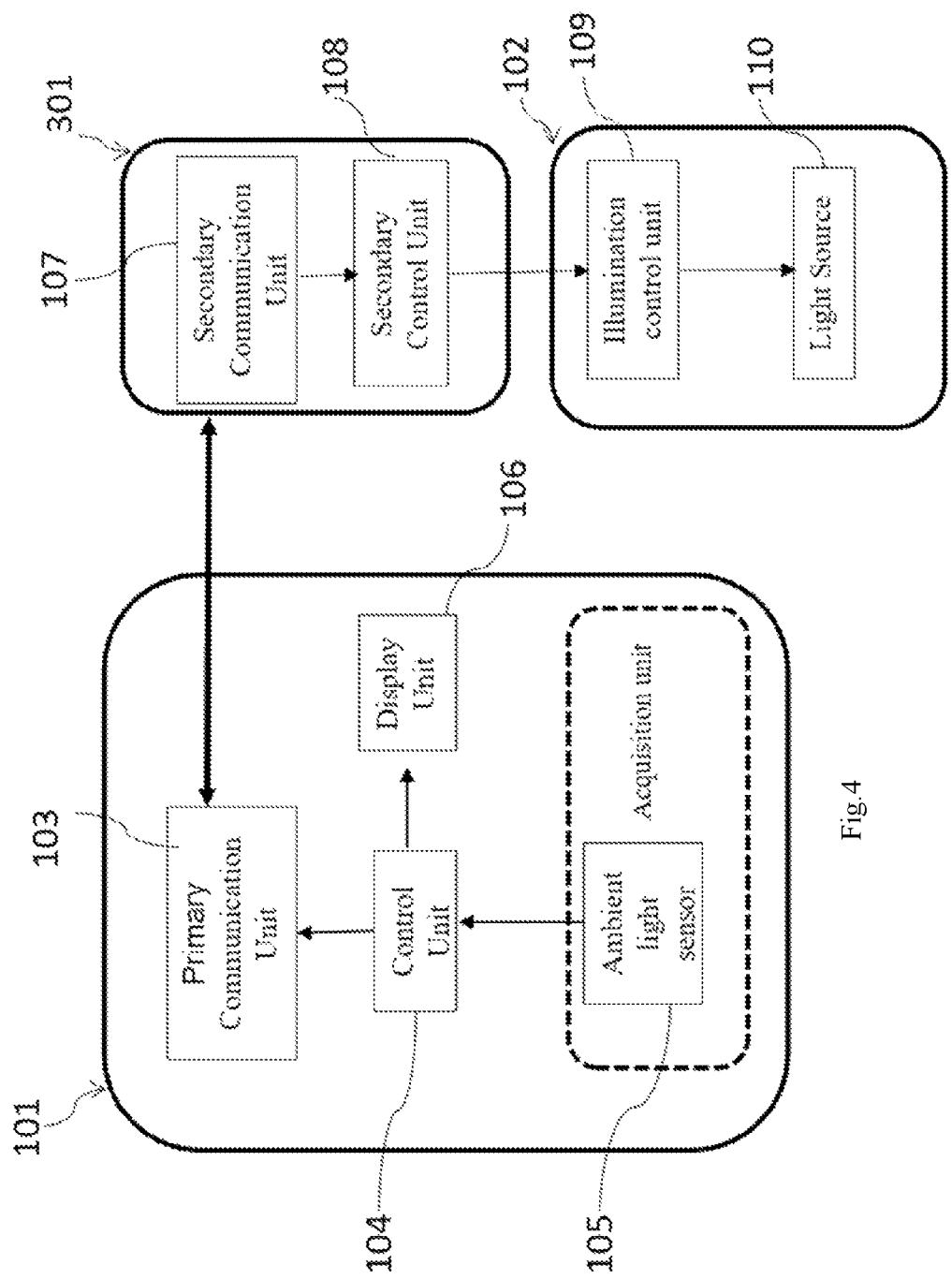
FIG. 4 illustrates another embodiment involving vehicle Engine control unit directly controlling the head lamp.

FIG. 4 illustrates another embodiment where, instead of wireless communication, the vehicle ECU (301) controls the head lamp (102) directly such that the head lamp (102) is electrically connected to the vehicle ECU (301) and the vehicle ECU (301) has a software installed in the secondary control unit (108) and in order to control the illumination control unit (109) of the head lamp (102) and the light source (110), necessary instructions are provided from the secondary control unit (108) of the vehicle ECU (301) to the illumination control unit (109).

Figure 5:
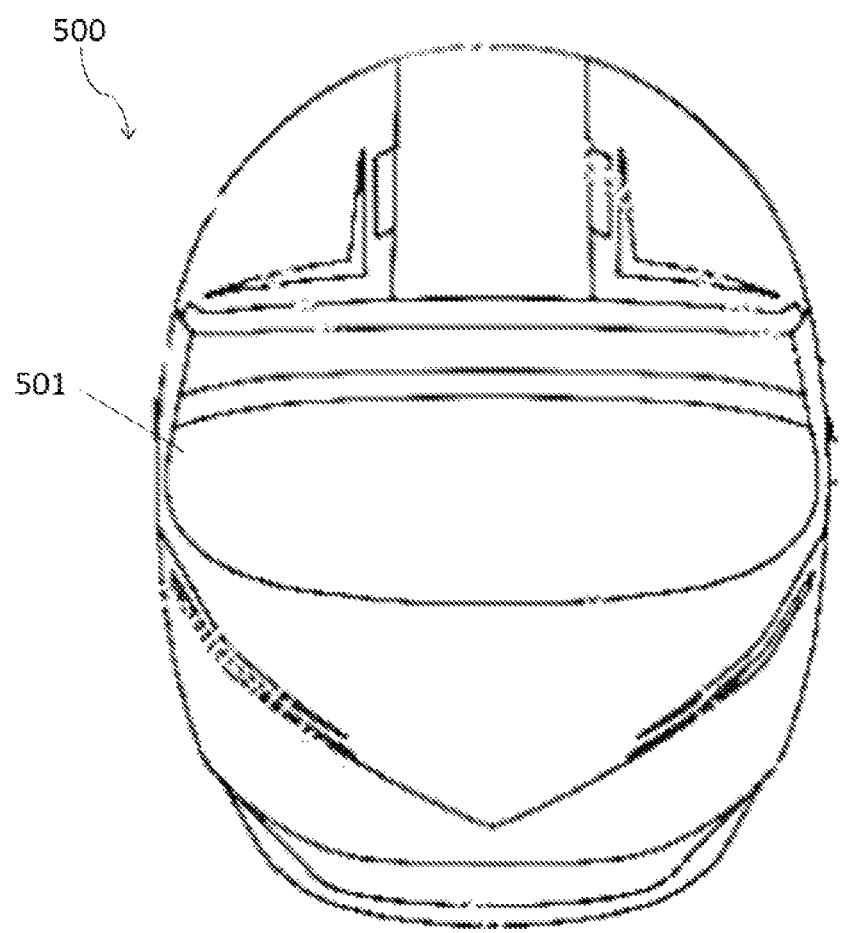
FIG. 5 illustrates front portion of wearable head gear such as a helmet.

FIG. 5 illustrates front portion of wearable head gear such as a helmet (500). The helmet (500) comprises of a transparent wind screen (501) through which the driver can see the outside objects. The head mounting unit (101) is being mounted on the wind screen (501) which allows the ambient light sensor (105) to receive the outside ambient light intensity which is in the view field of the driver. Similarly, the head like a helmet (500) can be replaced by other head gear or an eye gear such as goggles on to which the head mounting unit (101) can be placed.

Many modifications and variations of the present subject matter are possible in the light of above disclosure. Therefore, within the scope of claims of the present subject matter, the present disclosure may be practiced other than as specifically described.

We claim:

1. A light intensity control system for a vehicle comprising:
   a head mounting unit comprising a primary communication unit, a primary control unit, a display unit, and an ambient light sensor to collect an input,
   wherein
   the head mounting unit is mounted on a head gear and receives ambient light intensity in a field view of a rider of the vehicle through the ambient light sensor,
   the head mounting unit is connected to and controls illumination of one or more illuminating devices disposed in the vehicle,
   each of the one or more illuminating devices comprises an illumination control unit and a light source, the primary communication unit receives the input from the ambient light sensor and transmits the input to the one or more illuminating devices in the vehicle, such that the illumination control unit controls an output from the light source based on the input.

2. The light intensity control system as claimed in claim 1, wherein the head gear is a helmet or a goggle.

3. The light intensity control system as claimed in claim 1, wherein
the input from the primary communication unit causes, in each of the one or more illuminating devices, the illumination control unit to control toggling of one or more beam positions of the light source, and
the one or more illuminating devices are one of a headlamp and an instrument cluster.

4. The light intensity control system as claimed in claim 1, wherein
at least one of the one or more illuminating devices is an instrument cluster comprising an illuminating display, and
the input from the primary communication unit causes the illumination control unit to control illumination of the illuminating display of the instrument cluster.

* * * * *